A. H. POWELL.
FRUIT SLICER AND CORER.
APPLICATION FILED AUG. 20, 1917.
1,271,218.
Patented July 2, 1918.
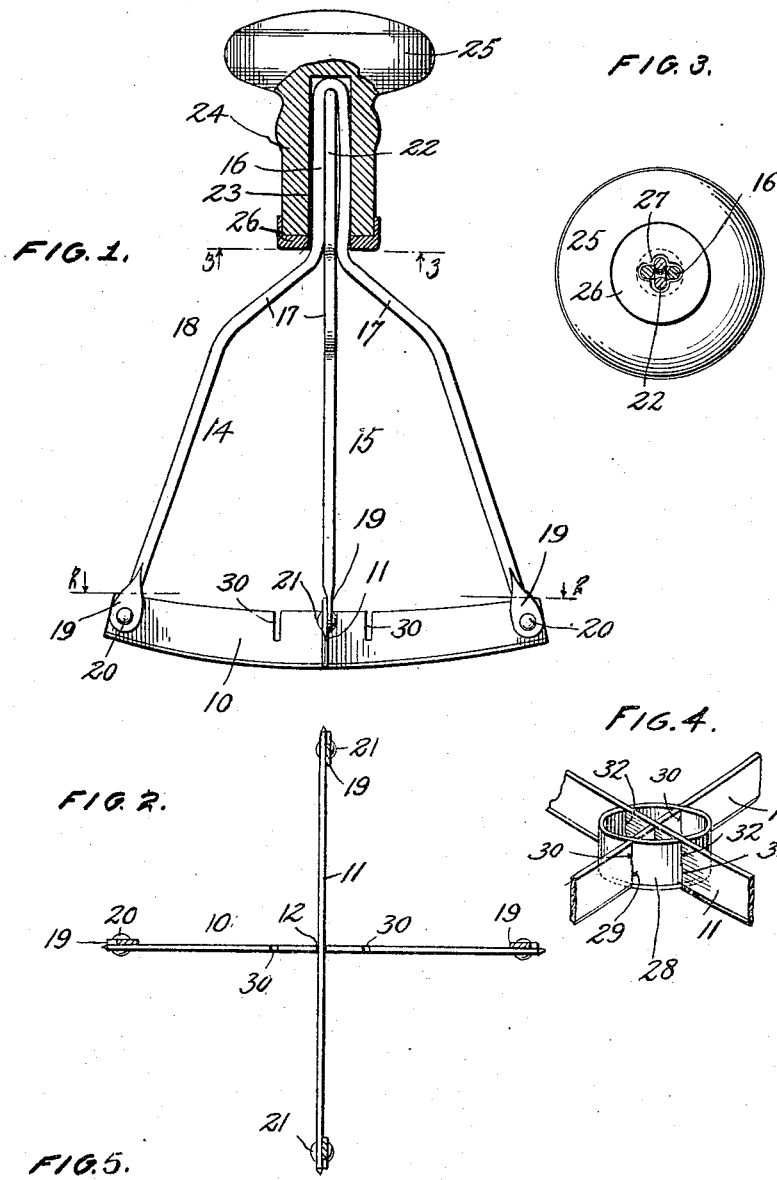
WITNESSES
INVENTOR
Alfred H. Powell
BY 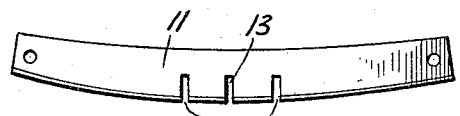
ATTORNEY

UNITED STATES PATENT OFFICE.

ALFRED H. POWELL, OF AMERICAN FORK, UTAH.

FRUIT SLICER AND CORER.

1,271,218. Specification of Letters Patent. Patented July 2, 1918.

Application filed August 20, 1917. Serial No. 187,233.

*To all whom it may concern:*

Be it known that I, ALFRED H. POWELL, a citizen of the United States, residing at American Fork, in the county of Utah and State of Utah, have invented certain new and useful Improvements in Fruit Slicers and Corers, of which the following is a specification.

This invention relates to a fruit slicing and coring knife and has for its primary object to provide an article for the purpose designed which shall be simple, strong, of few parts, and which can be quickly taken apart and reassembled for the purpose of cleaning and preparing for future use.

Another object of the invention is to provide in an article of the kind interlocking slicing knives which are usable alone or which may be interlocked with a circular coring knife, the latter being capable of attachment to the slicing knives without other means than interlocking notches between said parts.

A further object of the invention is to provide a simple and efficient means for holding the interlocked knives in operative position in connection with the handle of the device whereby the parts are rigidly and firmly held in place by frictional contact thereof with said handle and all extraneous devices heretofore used to hold the parts together eliminated.

With the above as the principal object in view, the invention consists in the novel construction, combination and arrangement of parts hereinafter described, pointed out in the appended claims and illustrated in the accompanying drawing, in which, Figure 1 is an elevation of the complete cutting device for slicing fruit without coring the same, Fig. 2 is a horizontal cross sectional view on the line 2—2 of Fig. 1, Fig. 3 is a similar view on the line 3—3 of the same figure, and Fig. 4 is a perspective view of the coring knife in position on the slicing knives.

Fig. 5 is a view of a slicing knife detached.

In the drawings, 10 and 11 indicate two slicing blades preferably made of thin sheet metal of arcuate shape edgewise, the convex edges of which blades are sharpened as shown to permit their ready passage through the fruit being sliced. The curvature of the blade is not very pronounced, being sufficient only to permit the device being rocked after passing through the fruit to insure complete division of the fruit.

The blades 10 and 11 are each provided with a central notch, that on the blade 10 and indicated by 12 extending halfway through the blade from the upper edge thereof while the blade 11 has its central notch 13 extending upwardly from the bottom or cutting edge half the width of the blade. As thus constructed, these blades may be quickly and easily assembled by engaging the notches 12 and 13 therein, the blades as will be seen cross each other centrally and at right angles, as indicated in Fig. 2.

Each blade 10 and 11 is mounted on the lower end of a support as represented by 14 and 15, each support being made of stout wire bent centrally upon itself to form a duplex straight stem 16, the two parts of which extend in parallel relation a short distance apart for a suitable distance and then diverge sharply as they continue in a downward direction as at 17, being again bent at 18 and then continuing in straight but less divergent lines to the ends of the blade 10. The ends 19 of the support 14 are preferably flattened and then connected to the ends of the blade 10 by rivets 20.

The support 15 is constructed in a manner similar to the support 14 and is connected to the ends of the blade 11 by rivets 21. The stem 22 of the support 15 fits between the two portions of the stem 16, the two stems thus assembled fitting within a longitudinal bore 23 in a handle 24 which is here shown as provided with an enlarged knob-shaped hand grip 25. The lower end of the handle 24 is protected by a cup-shaped ferrule 26 through the under side of which is a cruciform opening 27 for the passage therethrough into the handle of the stems 16 and 22. The supports 14 and 15 are secured to the handle by outwardly bowing one of the members of the duplex stem 16 which though described as being parallel are only substantially so, a sufficient bowing being given one or both of the portions 16 to cause them to hold the stems within said bore and the two stems tightly clamped together.

Constructed as described, the device forms a complete fruit slicer and after use as such, may be disassembled by withdrawing the handle from the stems of the supports and, after separating them by a lateral movement, the knives may be readily disconnected. To reassemble the parts, the operation is of course the reverse of that described.

When it is desired to core fruit as well as slice the same, a coring knife 28 is connected to the blades 10 and 11 at the intersection thereof, said knife comprising a circular band of a proper diameter and a height equal to that of the blades 10 and 11 sharpened on the bottom similar to the blades. Two slots 29 are formed in the coring knife diametrically opposite each other and extending from the bottom of the knife upwardly for one-half the height thereof and engage with and interlock with like slots 30 in the blade 10 which extend downwardly from the top of said blade on opposite sides and equally spaced from the slot 12. When the coring knife 28 is interlocked with the blades 10, its lower sharpened edge will extend downwardly in line with the cutting edge of the blade 10 and will be held in place by the blade 11 which has notches 31 extending upwardly from the bottom that engage and interlock with opposite notches 32 extending downwardly from the top of the coring knife. By this means, the coring knife is held in place securely and yet easily removable by disassembling the two blades 10 and 11 in the manner above described and thus the use of screws, pins or other means for fastening the same is not required.

From the disclosure thus made, it is evident that a device constructed in the manner set forth will be firm and strong in use and being of few parts readily disconnected, and can be easily and thoroughly cleaned. A small amount of material is required in the construction and the device can be made at small cost. The notches 30 and 31 in the blade may be placed nearer to or farther from the intersection of said blade to permit the use of smaller or larger coring knives, or their number may be increased for the attachment of a plurality of intersecting blades so that the device can be readily converted into a mincing knife.

What is claimed is:

1. A device of the character described comprising a pair of intersecting blades having notches on opposite edges to interlock said blades, an annular knife having notches on opposite edges so disposed as to engage coöperating notches in the intersecting blades for holding the annular knife in place on said blade, a two-part support for the knives, each part being connected to the outer ends of one of said blades and extending upwardly therefrom, a duplex stem formed on the upper end of each support part, one or more of said stem parts being bowed outwardly, and a handle having a central bore adapted to fit over said stems, and frictionally engage therewith for securing all of said parts together.

2. A device of the character described comprising a pair of blades intersecting each other at right-angles and having notches in opposite edges to interlock said blades together in operative relation, an annular knife having notches in its opposite edges adapted to engage and interlock coöperating notches in said blades for holding said annular knife in concentric relation with the crossing of said blades, a two part support each part connected to the ends of one of said blades and converging upwardly therefrom, a stem formed on the upper end of each of said support parts, said stems adapted to interengage one with the other, and a handle having a longitudinal bore adapted to frictionally engage said stems to secure all of said parts in operative relation.

3. A device of the character described comprising a pair of oppositely notched intersecting blades adapted to be disassembled, an annular knife also formed with notches on opposite edges to engage coöperating notches on the intersecting blades, said knife being held concentric to the crossing of said blade by said notches, a support connected to each of said blades having a stem on its upper end, said stems interengaging one with the other, and a handle having a longitudinal bore adapted to frictionally engage said stems to secure all of said parts in operative position and when removed to permit separation of the blades and the annular knife.

In testimony whereof I affix my signature in presence of two witnesses.

ALFRED H. POWELL.

Witnesses:
JAMES CHIPMAN, Jr.,
BENJ. BATES.

Copies of this patent may be obtained for five cents each, by addressing the "Commissioner of Patents, Washington, D. C."